US009290161B2

(12) United States Patent
Belanger et al.

(10) Patent No.: US 9,290,161 B2
(45) Date of Patent: Mar. 22, 2016

(54) VEHICLE WHEEL WASHER

(71) Applicant: Belanger, Inc., Northville, MI (US)

(72) Inventors: Michael J. Belanger, Northville, MI (US); Barry S. Turner, Novi, MI (US); Thomas E. Weyandt, Northville, MI (US); Jerry A. Kotrych, Livonia, MI (US); Mark D. Morin, Plymouth, MI (US)

(73) Assignee: Belanger, Inc., Northville, MI (US)

( * ) Notice: Subject to any disclaimer, the term of this patent is extended or adjusted under 35 U.S.C. 154(b) by 80 days.

(21) Appl. No.: 13/872,190

(22) Filed: Apr. 29, 2013

(65) Prior Publication Data

US 2013/0291906 A1 Nov. 7, 2013

Related U.S. Application Data

(60) Provisional application No. 61/641,450, filed on May 2, 2012.

(51) Int. Cl.
*B60S 3/04* (2006.01)
(52) U.S. Cl.
CPC ...................................... *B60S 3/042* (2013.01)

(58) Field of Classification Search
CPC ............. B05B 1/00; F04B 35/04; B60S 3/00; F15B 15/063; B25B 5/062
USPC ........................................................... 134/123
See application file for complete search history.

(56) References Cited

U.S. PATENT DOCUMENTS 3,869,928 A * 3/1975 Ishii et al. ......................... 74/88
6,561,199 B2 * 5/2003 Gleeson et al. ............ 134/22.18

FOREIGN PATENT DOCUMENTS

EP 0050466 A1 * 4/1982
WO WO-9323655 A1 * 11/1993 ................ F01B 3/00

* cited by examiner

*Primary Examiner* — Karla Moore
*Assistant Examiner* — Tinsae Ayalew
(74) *Attorney, Agent, or Firm* — Young Basile Hanlon & MacFarlane, P.C.

(57) ABSTRACT

A spray-type washer for a conveyor-type car wash comprises a support stand with a power cylinder that drives a piston. Pins on the piston ride in slots formed in a rotatable cam that is connected to a spray unit such that piston travel produces a swivel motion of a spray unit mounted on the support stand. The spray units use multiple impeller-type sprayers. The washers are used in pairs, one washer on each side of a conveyor lane.

16 Claims, 4 Drawing Sheets

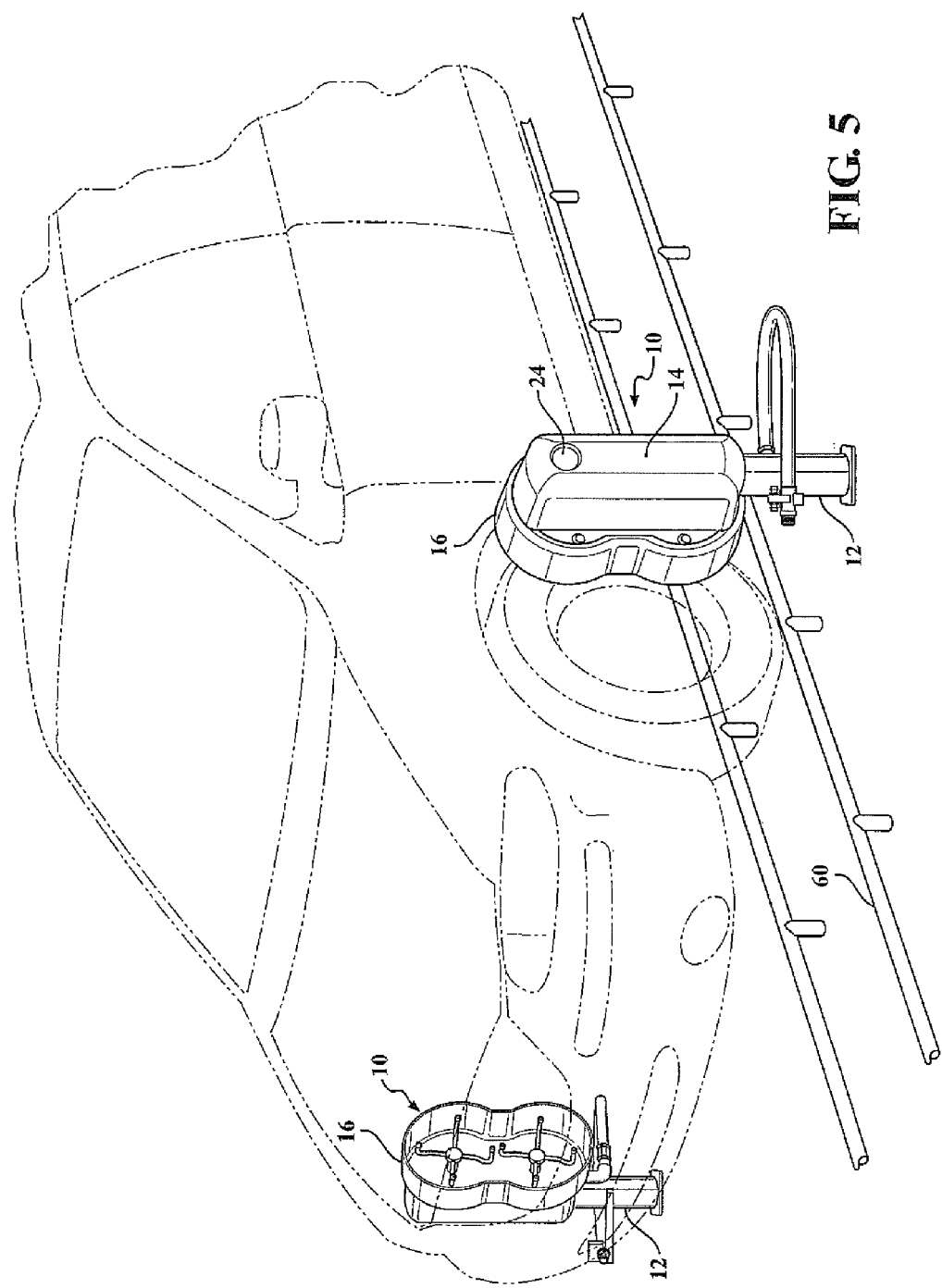

VEHICLE WHEEL WASHER

CROSS REFERENCE TO RELATED APPLICATION

This application claims the benefit of U.S. Provisional Application Ser. No. 61/641,450 filed May 2, 2012.

FIELD OF THE INVENTION

This invention relates to vehicle washers capable of following a moving vehicle and more particularly to a washer having one or more spray nozzle spinners to direct streams of fluids under pressure at the wheels of a vehicle moving along a car wash conveyor.

BACKGROUND OF THE INVENTION

Effective wheel washing is often an important part of a commercial car wash operation, particularly as many automobiles are now purchased with premium wheels that add significantly to vehicle aesthetics.

Wheel washing was, at one time, performed manually, using brushes and soapy water. More recently, wheel washing is performed by spraying cleaning and rinsing fluids onto the wheels under pressure. An example of a spray-type wheel washer is found in U.S. Pat. No. 7,971,594 issued Jul. 5, 2011 and assigned to Belanger, Inc. of Northville, Mich. The washer described in this patent places spray heads in structures located in the lower ends of long pendulum arms that swing the spray heads along an arc as a vehicle wheel moves through a wheel rinsing location.

SUMMARY OF THE DISCLOSURE

The wheel washer disclosed herein is similar in some respects to the washer of U.S. Pat. No. 7,971,594; i.e., it also uses fluid sprays and can follow a moving wheel on a conveyor-driven vehicle. However, it does not require pendulum arms nor does it cause spray heads to move along an arc having different levels relative to the path of wheel movement. Rather, the washer of the present invention comprises a fixed support, easily mounted on the floor of a car wash beside a conveyor track, designed to carry a spray unit that can swivel about a substantially vertical axis at a constant level and at a controlled rate to direct fluid under pressure toward and onto a wheel on a passing vehicle.

According to the present disclosure, a novel vertical cam arrangement is used in combination with a power cylinder to swivel the spray unit in such a way as to keep pace with a moving wheel of a vehicle on a car wash conveyor track as it passes the spray unit.

As hereinafter described in detail, the illustrative embodiment comprises a cylindrical support body which can be mounted on the floor of a car wash installation on either side of a conveyor track. The body carries a vertically-oriented air cylinder that drives a plurality of radially extending cam pins in a reciprocal fashion; motion in the upward power stroke being effective to swivel the washer in the direction of travel of a passing wheel while the downward return stroke rapidly resets the washer to a start position for the next approaching wheel. The cam pins extend through spiral slots in a cylindrical cam body with one or more bearings that allow it to be rotated about the vertical axis of the support and the power cylinder. The body in turn is connected to a spray unit support arm connected by brackets to spinners with nozzles, (also called "impellers" herein). Fluid is supplied to the impellers by means of a conduit which extends upwardly through the support arm and enters the impeller hubs through the back of a shroud. Both forward and return speeds are adjustable by means of variable air flow valves in the supply lines to the air cylinder.

BRIEF DESCRIPTION OF THE DRAWINGS

The various features, advantages and other uses of the present invention will become more apparent by referring to the following detailed description and drawing in which:

FIG. 5 is a perspective view of a pair of wheel washers on opposite sides of a conveyor track.

DETAILED DESCRIPTION OF THE ILLUSTRATIVE EMBODIMENT

Figure 2:
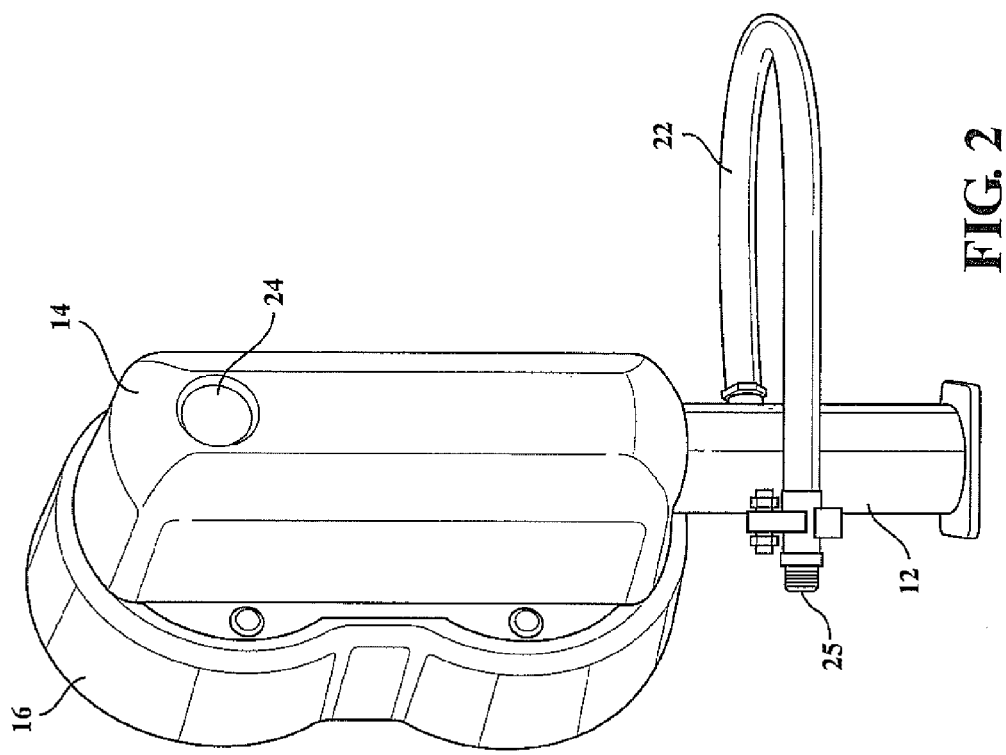
FIG. 2 is a rear perspective view of the subject wheel washer.
Figure 1:
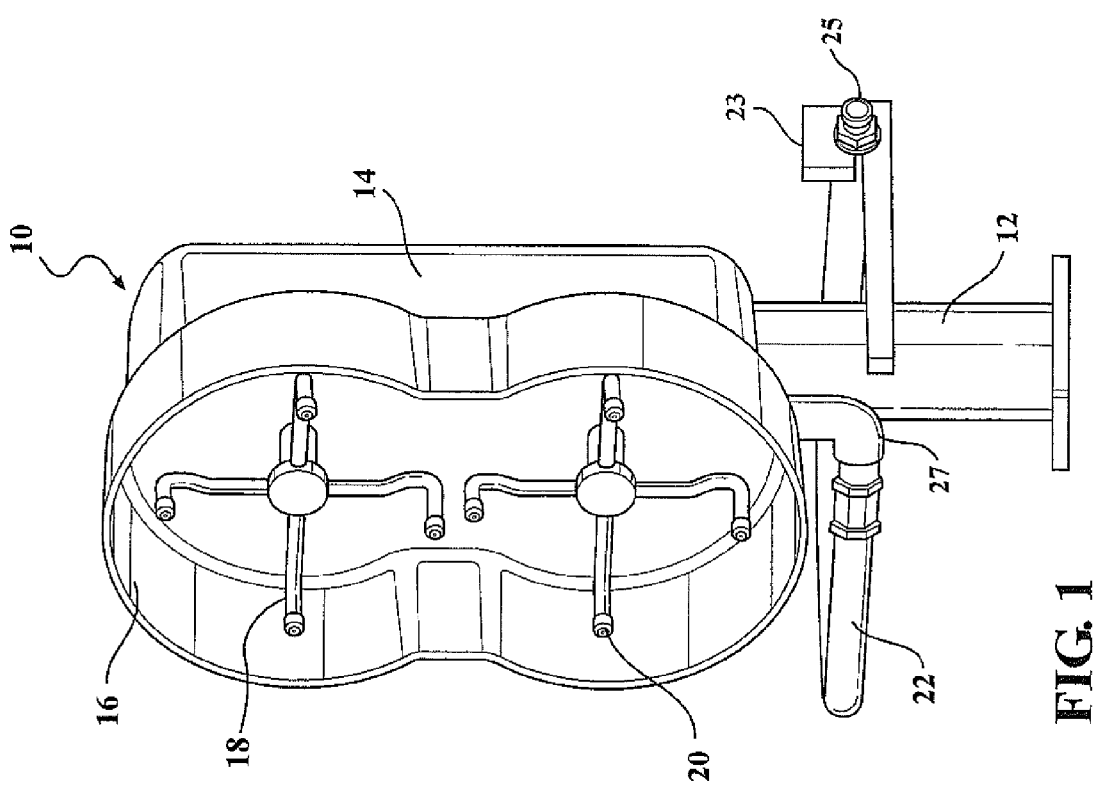
FIG. 1 is a front perspective view of an illustrative embodiment of the disclosed device using two impeller sets.

Referring to FIGS. 1 through 4, there is shown a wheel washer 10 comprising a cylindrical support body 12 in the form of a vertical stand with a bottom plate adapted to be bolted to the floor of a car wash structure adjacent a vehicle conveyor along which vehicles travel as they pass through the several stations of a conventional car wash. Such an arrangement is shown in FIG. 5. This washer 10 is intended to be used here as a rinsing device with the assumption that a wheel cleaner chemical has been applied to the wheels of a vehicle placed in or on a tunnel wash conveyor and allowed to soak. However, washer 10 may also be used to apply the washing fluids where some other mechanism is used for rinsing. Mounted on the support 12 of wheel washer 10 is a spray unit 14 which includes a Figure-eight shaped plastic shroud 16 encircling two sets of impellers having rotary arms 18 equipped with high pressure nozzles 20 on the outturned ends thereof to direct high pressure sprays of wheel washing fluids toward the wheels of a vehicle (FIG. 5) passing along a car wash conveyor. The term "high pressure" is used here to mean that the fluid emitted from nozzles 20 has sufficient energy to (a) rotate the impeller arms which carry the nozzles, and (b) impact the wheels of the vehicle with sufficient force and fluid volume to remove dirt and soap or other cleaning materials. It will be immediately understood by those familiar with car wash equipment that the overall height of the wheel washer 10 is such as to direct the sprays from the spinning nozzles toward the wheels of whatever type of vehicle is being washed; e.g., trucks and busses generally have bigger wheels than passenger cars, requiring taller washer structures. The height may be selected so as to place the top of the spray pattern at or near the top of most wheels. The bottom of the spray pattern is high enough to clear any conveyor rails or other obstacles that may exist. The nozzles 20 are angled all in the same direction so as to create a reaction force tending to spin the nozzle arms in the same direction, thus creating a spinning pattern of rinsing fluid.

Fluid is supplied to the impeller nozzles 20 by way of a flexible conduit 22 which is shown in the figures attached to the cylindrical support body 12 by means of a bracket 23 having a threaded fitting 25. Conduit 22 is connected by an elbow 27 to a vertical pipe 52 which is capped at 53, but has two vertically spaced side outlets 50 that communicate with the rotary hubs 54 of the impellers 18 and nozzles 20 to supply them with fluid. Brackets 46 secure the shroud 16 to the pipe 52. Fluid can be supplied at various pressures from 60 to 1,000 psi and at rates of about 5-20 gallons per minute.

Figure 3:
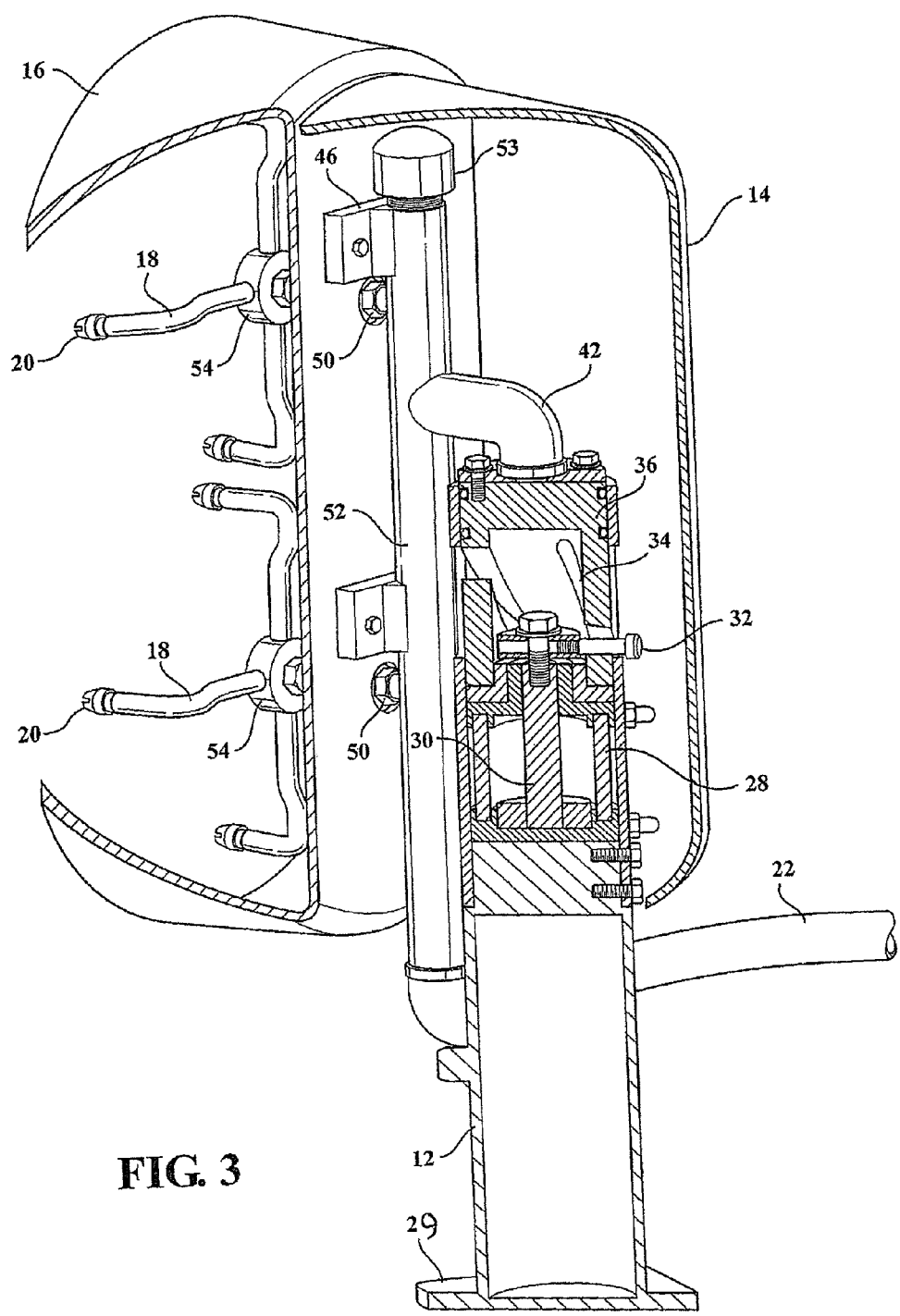
FIG. 3 is a three-quarter perspective view of the subject wheel washer with parts broken away and other parts in section to show internal details.

Looking now to FIGS. 3 and 4, more details of the device will be described. The cylindrical support body 12 may be made in two or more coaxial and mechanically connected pieces, the lower piece having a plate 29 at the bottom which can be fastened to a concrete floor or other structure. An air cylinder 28 is mounted within the upper body 12 and encloses a power piston 30 which travels vertically along the center line of the cylindrical support body 12. At the upper end of the piston 30, there is a fitting with three equally angularly spaced and radially outwardly extending pins 32 which extend through the spiral slots 34 in a cam body 36 which is coaxial with the body 12 and which rotates within the support body 12 as the cam pins 32 are driven vertically by the piston 30. The slots 34 are spiral shaped and the shape causes a programmed relationship between the vertical rate of displacement of the piston 30 and the angular rotation of the cam 36. The cam 36 is supported within the upper piece of the support housing 12 by way of ball bearings 38 shown best in FIG. 4. The top of the cam 36 is connected by an elbow structure 42 to the vertical support pipe 52. This is a purely mechanical connection as no fluid flows through elbow 42. The shape of slots determines the ratio between vertical travel of the pins 32 and angular travel of cam 36. Since cam 36 is directly connected to the spray unit 14, vertical travel of piston 30 causes swivel rotation of the spray unit 14. The slots may be shaped to provide either a fixed ratio or a variable ratio. For example, if the slots have a varying pitch, and the piston 30 moves at a constant rate, the spray unit 14 may swivel at a variable rate so as to track with the passing wheel more accurately. In any event, the cylinder 28 is preferably supplied with lower pressure air during the up stroke and higher pressure air during the down stroke so that the return movement of the spray unit 14 to the start position is faster.

To summarize, the end result is that vertical displacement of the power cylinder piston 30 causes rotation of the cam 36 by reason of the movement of the pins 32 in the programming slots 34. The rotation of the cam 36 swivels the spray unit 14 about a vertical axis so as to maintain an accurate targeting of the water streams toward the vehicle wheels during movement past the wheel washers as the vehicle progresses along the conveyor. Total swivel is about 60°; i.e., 30° away from dead center on both directions.

Figure 4:
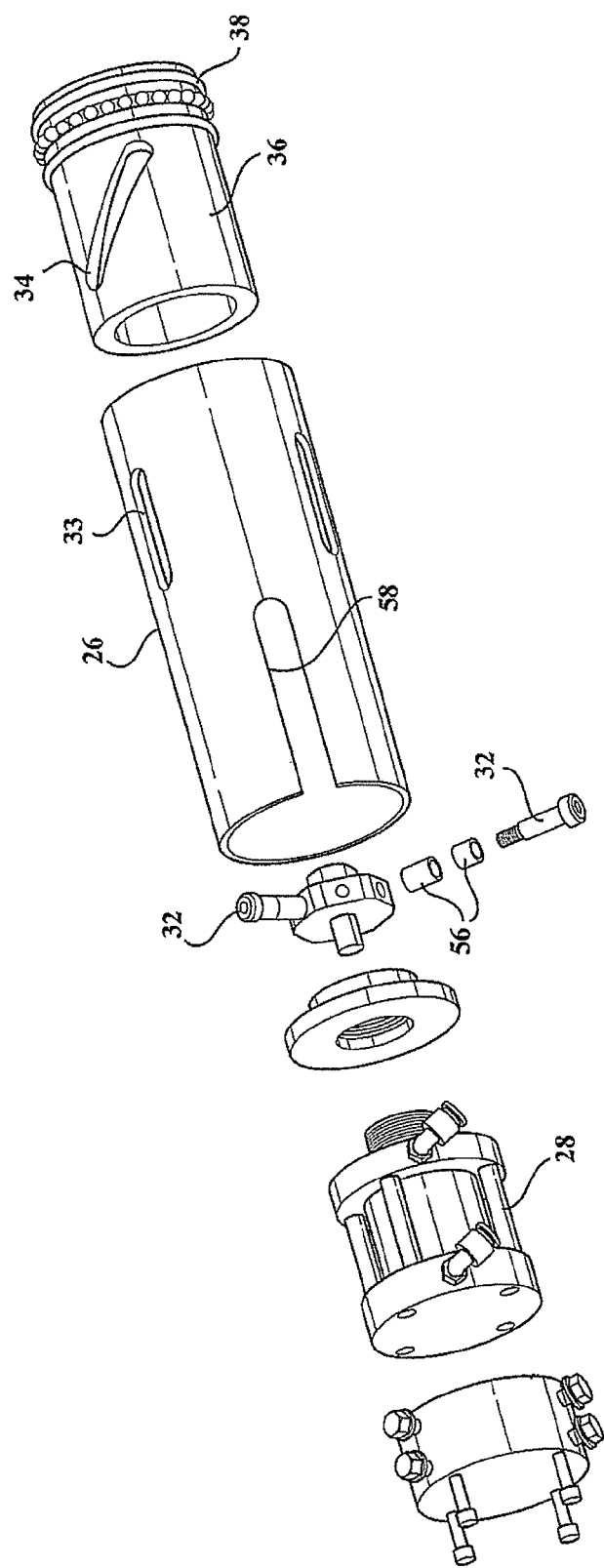
FIG. 4 is an exploded view of the principal components of the drive system minus the impeller arm shroud and cover of the illustrative wheel washer.

As shown in FIG. 4, bushings 56 on the pins 32 such that the inner bushing 56 rides in the cam slot 34 while the outer bushing 56 rides in a vertical slot 33 in the fixed upper housing 26 which is part of the overall support structure. Slots 33 prevent the pins 32 from rotating as they travel upwardly. Slot 58 accommodates the fitting on air cylinder 28.

As indicated above, the air pressure to the cylinder 28 is selected to provide the necessary power. Air flow rates in both forward and return directions are regulated so that the motion of the swivel with the wheel is relatively slow while the return speed is relatively fast. Speeds are controlled by valves 24 which are shown on the back side of the cover 14 in FIG. 5, it being understood that the valve 24 is connected to a set of air supply lines which are, in turn, connected to opposite sides of the power cylinder 28 as shown in FIG. 4. In actual practice, there are two flow rate control valves, one to set forward speed and the other to set return speed. The return or downward stroke of the piston 30 is relatively more rapid in order to reset the wheel washer to the initial angular position for the approach for the next wheel to be washed. As will be apparent to the person skilled in the art, suitable sensors (not shown) are used to detect the approach of vehicle wheels to the wheel washers 10 such that the sprayed fluids may be turned on only when necessary to wash a wheel and turned off between wheels of the same vehicle as well as between vehicles on the conveyor. Thus, chemicals and rinse water are conserved. Suitable sensors are optical beams, sonic sensors, floor strips and wands operating switches.

As shown in FIG. 5, the wheel washers are generally installed in pairs, one on each side of a wash lane defined by guide rails 60. As a result, the swivel and return directions are mirror images of one another. To eliminate the need to construct different cams 36, the valves that are used to control forward and return speeds are reversed as between the two washers in a given pair; i.e., the direction and speed of forward motion of one washer is the direction and speed of return motion of the other washer.

It will be appreciated by those reading the above disclosure that the inventive device has been described with reference to an illustrative embodiment having a particular structure and that various changes to this structure can be made without departing from the spirit and scope of the inventive activities represented here. By way of example, more or fewer impeller arms as well as fixed nozzles can be arranged on or within a wheel washer. Similarly, the size of the washer may be varied according to whether conventional automobiles or larger vehicles such as trucks are being treated. Additionally, the vertical axis may be rotated to horizontal to provide additional oscillation effects.

As stated above, the shape, length and angular scope of the cam slots 34 determine the relationship between the vertical travel of the piston 30 and the angular movement of the cam 36 and the spray unit connected to it. First, the vertical length of the slots generally corresponds to the available extension of the piston 30. Second, the extent to which the slots 34 wrap around the cam 36, here 60°, determines the total angular swivel of the spray unit. Finally, the slope of the slots 34 determines the ratio of linear piston travel to angular cam travel for any given position of the piston. If a constant rate of angular swivel is desired, the slope of the slots 34; i.e., the angle of the slot edges relative to vertical, will be constant. However, a variable ratio can easily be achieved where it is desired to have the spray unit point directly at a wheel during the entire time a wheel is being sprayed. To accomplish this, it is necessary to vary the ratio so the angular rate of change is slower at the opposite ends of the slots 34 and fastest at a midpoint; i.e., when the wheel is directly in front of the sprayer. To achieve this feature, the slope of the slots 34 varies so that it is greatest at the piston travel midpoint, and gradually becomes less toward the top and bottom ends of the slots. Thus, the shape of the slots 34 "program" the rotation or swivel rate of the spray unit to keep pace with a wheel moving at a fixed rate along the conveyor path.

What is claimed is:
1. A vehicle wheel washer comprising:
a fixed base having an operating axis;
a spray unit operably mounted on said base for swivel motion about said operating axis and connectable to a source of fluid, said spray unit including at least one impeller assembly defining a spinner axis mounted at an angle to said operating axis, said impeller assembly including a plurality of spinner arms each having a nozzle mounted on an end of said spinner arm for projecting fluid, said nozzle oriented at an oblique angle relative to said spinner axis to cause rotation of the impeller assembly about said spinner axis by fluid reaction; and an actuator carried by said base for producing controlled reciprocal swivel motion of said spray unit about said operating axis, wherein said actuator comprises:
an air cylinder fluidly connected to a source of pressurized air;
a piston located in said air cylinder, said piston connected to be moved axial along said operating axis by said cylinder in response to said pressurized air;
at least one radial cam driving element attached to said piston for concurrent axial movement therewith along said operating axis;
a cam unit slideably connected to said at least one cam driving element and responsive to axially movement of said piston along said operating axis to rotate said cam unit and said spray unit about said operating axis; and
wherein said air cylinder is fluidly connected to the source of pressurized air for moving said piston along said operating axis.

2. A wheel washer as defined in claim 1 further comprising a valve or set of valves for setting the speeds of reciprocal movement of said spray unit about said operating axis in both forward and return directions.

3. A wheel washer as defined in claim 1 wherein said spray unit further comprising a shroud surrounding said impeller assembly.

4. A wheel washer as defined in claim 1 wherein said operating axis is substantially vertical.

5. A vehicle washer usable in pairs in a car wash comprising:
a base adapted to be mounted in a fixed position adjacent a car wash lane;
a bi-directional linear actuator cylinder mounted to said base, said cylinder including a piston moveable axially along a longitudinal axis of said cylinder;
a plurality of radial cam driving elements attached to said piston for concurrent axially movement therewith along said longitudinal axis;
a rotatable cam element connected to said cam driving elements;
a fluid spray unit operably mounted on said base for reciprocal swivel motion about said longitudinal axis, said spray unit connectable to a source of fluid; and
a radial elbow having one end attached to said cam element and an opposite end attached to said fluid spray unit, said elbow extending radially outward relative to said longitudinal axis, wherein said cam element includes at least one programmed cam surface adapted to follow said cam driving elements during movement of said piston along said longitudinal axis to cause concurrent rotation of said elbow and said fluid spray unit about said longitudinal axis in a direction and at a rotational speed related to the direction and speed of axial movement of said piston.

6. A washer as defined in claim 5 wherein said cam element comprises a cylindrical body with a plurality of helical grooves formed therein and receiving said radial cam elements so as to rotate when the cam elements, driven by said cylinder, move axially along said longitudinal axis.

7. A washer as defined in claim 5 wherein said fluid spray unit comprises an impeller rotatable about an impeller operating axis, said impeller having radial fluid conduit arms with nozzles on the ends thereof, said nozzles oriented at an oblique angle relative to said impeller operating axis.

8. A washer as defined in claim 7 further comprising a shroud around said impeller.

9. A washer as defined in claim 7 wherein said cylinder is powered by air for moving said piston along said longitudinal axis and fluid received from said source of fluid is discharged through said nozzles at an oblique angle relative to said spinner axis to cause rotation of said impeller assembly about said spinner axis by fluid reaction.

10. A vehicle washer comprising:
a stand;
a power cylinder mounted to said stand and having a piston reciprocally movable along a longitudinal axis, said power cylinder fluidly connected to a supply of pressurized air for moving said piston along said longitudinal axis;
a set of radial pins carried by said piston for concurrent axial movement therewith along said longitudinal axis;
a cylindrical cam having programming slots configured to receive said pins therein; and
at least one impeller assembly fluidly connected to a source of fluid, said impeller operably connected to said cam to concurrently swivel about said longitudinal axis in response to axial movement of said piston along said longitudinal axis, said impeller defining a spinner axis and including a plurality of spinner arms each having a nozzle mounted on an end of said spinner arm for projecting fluid, said nozzle oriented at an oblique angle relative to said spinner axis to cause rotation of said impeller assembly about said spinner axis by fluid reaction.

11. A wheel washer as defined in claim 10 wherein said slots are spiral shaped.

12. A wheel washer as defined in claim 1, wherein said at least one radial cam driving element slideably engages a spiral slot in said cam unit.

13. A wheel washer as defined in claim 1, wherein said spray unit is attached to said cam unit for concurrent reciprocal rotation therewith about said operating axis.

14. A washer as defined in claim 5 further comprising means for controlling the speed of movement of said piston in at least one direction.

15. A washer as defined in claim 5 further comprising a housing enclosing said cam element, said housing including a plurality of elongated slots slideably receiving the plurality of cam driving elements, a longitudinal axis of the elongated slots aligned substantially parallel to the longitudinal axis of the cylinder.

16. A washer as defined in claim 15, wherein said cam element rotatably engages said housing.

\* \* \* \* \*